June 23, 1970  J. W. DONNELLY ET AL  3,516,812
TRIPLE GOB GLASS FEEDER
Filed July 10, 1967  2 Sheets-Sheet 1
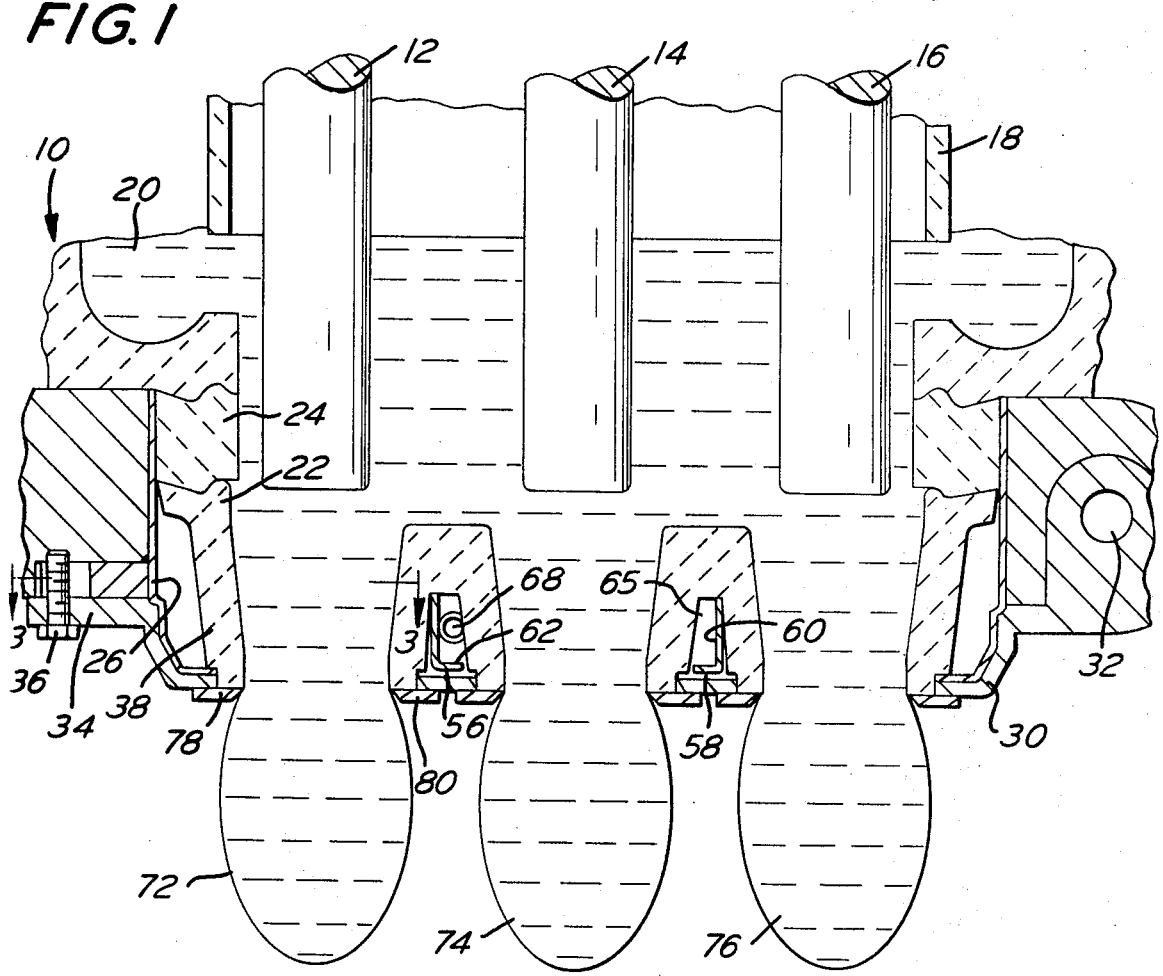
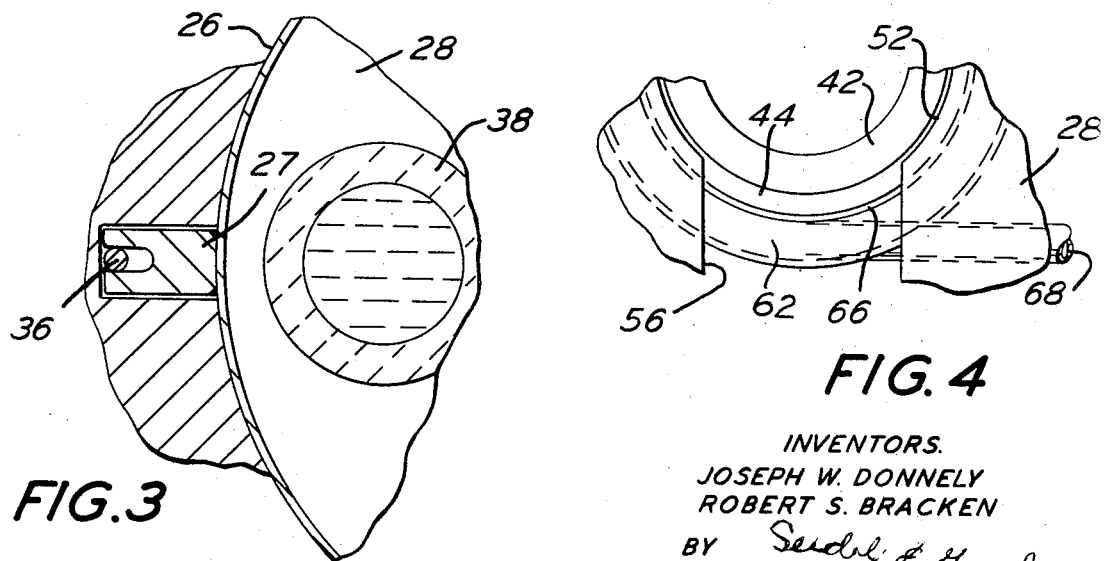
INVENTORS.
JOSEPH W. DONNELY
ROBERT S. BRACKEN
BY Seidel & Gonda
ATTORNEYS.

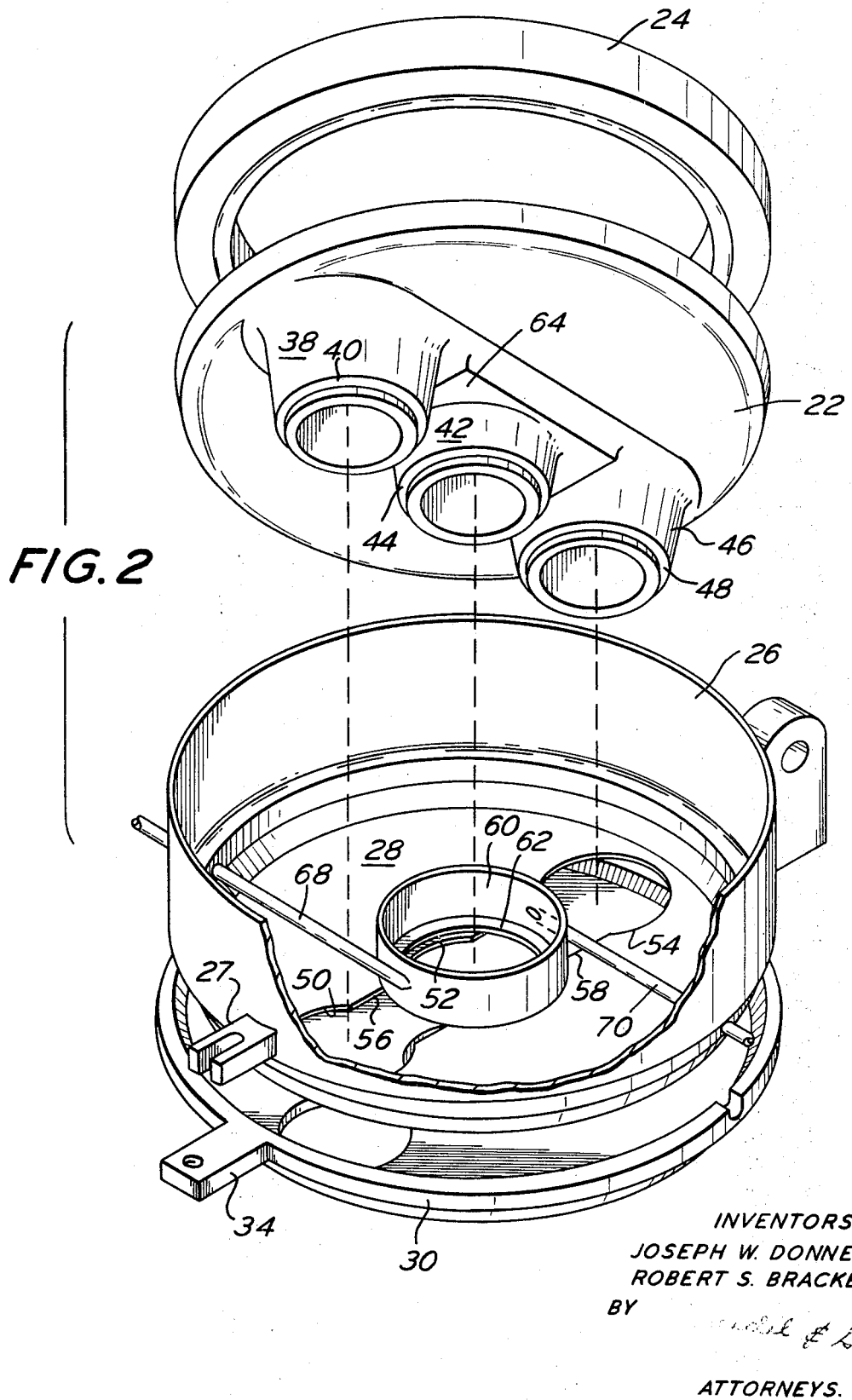

United States Patent Office 3,516,812
Patented June 23, 1970

3,516,812
TRIPLE GOB GLASS FEEDER
Joseph W. Donnelly and Robert S. Bracken, Vineland, N.J., assignors to Maul Bros. Inc., Millville, N.J., a corporation of New Jersey
Filed July 10, 1967, Ser. No. 652,179
Int. Cl. C03b 5/26
U.S. Cl. 65—327                                                7 Claims

ABSTRACT OF THE DISCLOSURE

A glass feeder is provided for feeding three streams of glass with cooling air around the center stream so that flow of all three streams is uniform.

---

The present invention is directed to a triple gob glass feeder for feeding three uniform streams of molten glass to the delivery system of an individual section machine. An example of a double gob feeder is shown in U.S. Pat. 2,310,290. When producing triple gob, so that bottles may be made three at a time, control of the flow of the center stream has presented a problem due to the fact that the center stream is warmer than the other streams. Hence, the center stream flows faster. As a result thereof, the glass gobs from the center stream are greater in weight as compared with the gobs from the other streams. The present invention is directed to method and structure for causing the streams to flow at the same rate so that there will be uniformity of weight to the gobs from each stream.

In accordance with the present invention, the orifice ring at the discharge outlet from the feeder is provided with three aligned passageways. The center passageway is circumferentially cooled by air for reducing the temperature of the center stream. Compensating for the temperature of the center stream is particularly important when the gob size is in excess of four ounces. The pan holder, pan and orifice ring are all structurally interrelated with one another so that the pan will be properly oriented with respect to the pan holder. Likewise, the orifice ring will always be properly oriented with respect to the pan and pan holder.

It is an object of the present invention to provide a triple gob glass feeder for feeding uniform gobs of glass to a press and blow or blow and blow glass forming machine.

It is another object of the present invention to provide a triple gob glass feeder orifice ring wherein the center passageway is surrounded by means for cooling the same to compensate for the otherwise excess temperature of the center stream.

It is another object of the present invention to provide a method for delivering gobs of glass three at a time with each gob being uniform in size within an acceptable range for manufacturing purposes.

Other objects will appear hereinafter.

For the purpose of illustrating the invention, there are shown in the drawings forms which are presently preferred; it being understood, however, that this invention is not limited to the precise arrangements and instrumentalities shown.

FIG. 1 is a vertical sectional view of the discharge portion of a glass feeder showing the orifice ring and embodying the present invention.

FIG. 2 is an exploded view of the pan holder, pan and orifice ring.

FIG. 3 is a sectional view taken along the line 3—3 in FIG. 1.

FIG. 4 is a partial bottom view of the pan.

Referring to the drawing in detail, wherein like numerals indicate like elements, there is shown the relevant portion of a glass feeder, namely the portion from which the glass discharges from the feeder. The feeder includes three adjustably positionable plungers 12, 14 and 16 for controlling flow through the discharge portion of the feeder. The plungers are disposed within a refractory tube 18 which is provided with conventional structure (not shown) for rotating the tube 18 about its longitudinal axis. For example, such conventional structure for rotating tube 18 may be that as shown in Pat. 2,310,290.

The heated molten glass 20, when discharging from the feeder 10, passes through an orifice ring 22. Ring 22 may abut directly against a portion of the feeder or may be spaced therefrom by a spacer 24, if desired. Orifice ring 22 and spacer 24, when provided, are conventionally made from ceramic or refractory materials. Orifice ring 22 will be described in greater detail hereinafter. Ring 22 is supported within a pan 26.

The pan 26 is an open top or cup-shaped pan having a bottom wall 28. Pan 26 is supported within a pan holder 30. Pan holder 30 has ears pivotably coupled to the feeder 10 by pin 22 so that the entire assembly of pan holder, pan and orifice ring may pivot about the longitudinal axis of pin 32. Diametrically opposite the ears, the pan holder 30 is provided with a tongue 34 which is removably connected to the feeder 10 by a bolt 36. For purposes of orientating the pan with respect to the pan holder 30, the pan 26 is provided with an orientation lug 27 having a recess through which the bolt 36 extends. Hence, the pan 26 and pan holder 30 will always be assembled in the same orientation.

As shown more clearly in FIGURE 2, the orifice ring 22 is provided with three hollow bosses 38, 42 and 44 aligned in a row. Boss 38 is provided with a shoulder 40 adjacent its free end. Boss 42 is provided with a shoulder 44 adjacent its free end. Boss 46 is provided with a shoulder 48 adjacent its free end.

The bottom wall 28 of the pan 26 is provided with aligned holes 50, 52 and 54. Holes 50 and 52 are interconnected by a slot 56. Holes 52 and 54 are interconnected by a slot 58. The position of holes 50, 52 and 54 corresponds to the position of the bosses 38, 42 and 46 on the orifice ring 22. The free or terminal end of boss 38 extends through the hole 50 with the shoulder 40 on boss 38 overlying the top surface of bottom wall 28 adjacent the hole 50. The boss 42 and hole 52 are likewise oriented with one another. The same orientation exits between boss 46 and hole 54.

A cylindrical wall 60 having a radially inwardly directed flange 62 is provided. Flange 62 overlies and is fixedly secured to the upper surface of wall 28 concentric with hole 52. As shown more clearly in FIGS. 2 and 4, the I.D. of the flange 62 is greater than the diameter of hole 52. As shown more clearly in FIG. 1, the upper edge of cylindrical wall 60 abuts a shoulder 64 which surrounds the boss 42 adjacent the area where boss 42 is integral with the orifice ring 22.

A cooling medium such as air is introduced into the chamber or space 65 by conduits 68 and 70. Space 65 is defined by the outer surface of boss 42, and the inner surface of wall 60, shoulder 64 and flange 62. The conduits 68 and 70 extend in opposite directions from diametrically opposite points on the wall 60 and are tangentially connected thereto. As a result thereof, the cooling air introduced into said space 65 from said conduits 68 and 70 will have a circumferential flow path. By using two diametrically opposite conduits, the air from each conduit will only cover 180 degrees and thereby assure that there will be no dead spots in said space. As shown more clearly in FIG. 4, air from said space will discharge downwardly through the arcuate slots 66. One such slot 66 is a portion of slot 56. The other slot 66 is a portion of slot 58.

The orifice ring has three passageways for permitting the flow of three parallel streams of molten glass. Each stream will be periodically separated into gobs 72, 74 and 76 by shear blades 78 and 80. Each of the gobs will be of uniform size and weight. Any tendency of the center stream from boss 42 flowing at a faster rate due to the increased temperature thereof will be reduced and/or eliminated by controlling the introduction of cooling air into space 65. The cooling air discharges downwardly through the slots 66 and returns to atmosphere. The temperature of the cooling air is reduced until the rate of flow of all three streams is identical or within acceptable manufacturing tolerances. It has been found that the greatest need for cooling air occurs when the weight of the gobs is in excess of four ounces.

The present invention may be embodied in other specific forms without departing from the spirit or essential attributes thereof and, accordingly, reference should be made to the appended claims, rather than to the foregoing specification as indicating the scope of the invention.

It is claimed:

1. A glass feeder comprising a body adapted to support molten glass and having a bottom discharge opening, three plungers in said body above said opening, a non-metallic orifice ring removably supported in said opening below the elevation of said plungers, said orifice ring having three passageways each of which is aligned with one of said plungers, wall means including a ring-like wall surrounding only the center one of said passageways, thereby forming a cooling chamber surrounding only the center passsageway, conduit means connected to said cooling chamber for circulating cooling air through said chamber for slowing down the rate of flow of molten glass through said center passageway relative to the flow through the other passageways, and a set of shear blades below each passageway of the orifice ring for simultaneously separating each stream into gobs of molten glass as the streams flow through the passageways.

2. A feeder in accordance with claim 1 wherein said plungers are parallel and aligned in a row, said passageways being aligned in a row below said row of plungers, a pan pivotably supported by said body, said orifice ring being supported by said pan, said ring-like wall being connected to said pan for movement therewith, said center passageway being defined by a boss on said orifice ring, the inner periphery of said cooling chamber being defined by the outer periphery of said boss, and slot means in the pan for permitting cooling air to escape downwardly from the cooling chamber to the surrounding atmosphere.

3. A feeder in accordance with claim 2 wherein said conduit means for circulating cooling air through said cooling chamber includes conduits tangentially connected to said cooling chember for introducing air into said chamber tangentially thereof.

4. In a glass feeder the improvement comprising a generally flat circular orifice ring of refractory material, said ring having three passageways extending therethrough in an axial direction and and aligned in a row, wall means including a cylindrical wall surrounding the center passageway thereby forming a cooling chamber for the center passageway, conduit means connected to said cooling chamber for circulating cooling air through said chamber for controlling the rate of flow of molten glass through the center passageway, and movable pan means coupled to the orifice ring for supporting the orifice ring in a horizontal position so that a glass stream may discharge downwardly through each passageway, the lower end of said cylindrical wall being connected to said pan means, the upper end of said cylindrical wall abutting said orifice ring.

5. In a feeder in accordance with claim 4 wherein said conduit means includes a pair of inlet conduits communicating with said cooling chamber at opposite points on said cylindrical wall.

6. In a feeder in accordance with claim 4 wherein said pan means includes a pivotably mounted pan, said pan having a slotted bottom wall, said lower end of said cylindrical wall being connected to said pan bottom wall and extending across slots in the bottom wall.

7. In a feeder in accordance with claim 4 wherein said pan means includes a pan, said pan having three holes interconnected by slots in its bottom wall, each hole in the bottom wall of the pan being aligned with one of the passageways in the orifice ring, each passageway in the orifice ring being in a boss on the orifice ring, each boss having a shoulder overlying a part of the pan bottom wall with the free end of each boss extending through one of said holes in the pan bottom wall.

References Cited
UNITED STATES PATENTS

| | | | |
|---|---|---|---|
| 1,660,430 | 2/1928 | Soubier | 65—328 XR |
| 1,926,764 | 9/1933 | Dorman | 65—328 |
| 1,680,543 | 8/1928 | Howard | 65—128 |
| 2,340,729 | 2/1944 | Barker | 65—128 |
| 2,634,553 | 4/1953 | Russell | 65—12 |
| 2,706,365 | 4/1955 | Stalego | 65—12 |
| 3,160,492 | 12/1964 | Chapman et al. | 65—128 |

FRANK W. MIGA, Primary Examiner

U.S. Cl. X.R.

65—128, 129, 328, 330, 356